United States Patent [19]
Palinkas et al.

[11] Patent Number: 4,784,201
[45] Date of Patent: Nov. 15, 1988

[54] NON-PNEUMATIC TIRE WITH VIBRATION REDUCING FEATURES

[75] Inventors: Richard L. Palinkas, Northfield, Conn.; Scott R. Pajtas, Royal Oak, Mich.; George H. Nybakken, Middlebury, Conn.

[73] Assignee: The Uniroyal Goodrich Tire Company, Akron, Ohio

[21] Appl. No.: 862,866

[22] Filed: May 13, 1986

[51] Int. Cl.⁴ .............................................. B60B 5/02
[52] U.S. Cl. ..................... 152/323; 152/12; 152/209 D; 301/63 PW
[58] Field of Search ............ 301/5 R, 63 PW; 152/5, 152/7, 12, 323, 324, 325, 326, 209 B, 209 D, 1

[56] References Cited
U.S. PATENT DOCUMENTS

| | | | |
|---|---|---|---|
| D. 57,836 | 5/1921 | Grow | 152/209 D X |
| D. 59,049 | 9/1921 | Weiler | 152/209 D X |
| D. 76,886 | 11/1928 | Nesmith | 152/209 D X |
| 1,258,573 | 3/1918 | Johnstone | 152/326 X |
| 1,441,654 | 1/1923 | Austin | 152/328 |
| 1,493,923 | 5/1924 | Deister | 152/325 |
| 1,494,797 | 5/1924 | Nimschke | 152/328 X |
| 2,603,267 | 11/1949 | Simpson | 152/7 |
| 2,620,844 | 12/1952 | Lord | 152/326 |
| 2,620,845 | 12/1952 | Lord | 152/328 |
| 3,188,775 | 6/1965 | Cosmos | 152/323 X |
| 3,470,933 | 10/1969 | Molnar | 152/330 |
| 3,870,372 | 3/1975 | Knipp | 301/63 PW |
| 3,888,545 | 6/1975 | Braun | 301/63 PW |
| 3,901,300 | 8/1975 | Toplis | 152/346 |
| 3,907,370 | 9/1975 | Bard | 301/63 R |
| 4,071,070 | 1/1978 | Schmidt | 152/333 |
| 4,169,494 | 10/1979 | Kubica et al. | 152/310 |
| 4,226,273 | 10/1980 | Long et al. | 152/326 |
| 4,235,270 | 11/1980 | Kahaner et al. | 152/7 |
| 4,287,927 | 9/1981 | Caravito et al. | 152/302 |
| 4,345,633 | 8/1982 | Gilmore | 152/328 |
| 4,449,756 | 5/1984 | Weeks | 301/63 PW X |
| 4,558,727 | 12/1985 | Golata et al. | 152/323 X |

FOREIGN PATENT DOCUMENTS

| | | | |
|---|---|---|---|
| 2460051 | 7/1976 | Fed. Rep. of Germany | 152/325 |
| 1726 | of 1915 | United Kingdom | 152/323 |
| 601764 | 5/1948 | United Kingdom | 152/325 |

Primary Examiner—Robert B. Reeves
Assistant Examiner—R. Stormer
Attorney, Agent, or Firm—Alfred D. Lobo; Alan A. Csontos

[57] ABSTRACT

A non-pneumatic tire with an annular body of resilient elastomeric material and an outer cylindrical member supported by circumferentially spaced-apart ribs, is provided with four vibration-reducing features. First, the tire has an outer tread surface with a crown radius. Secondly, the tread has a pattern with a plurality of circumferential grooves and lateral grooves arranged to reduce uneven contact pressures caused by radial forces carried by the tire's ribs. Thirdly, the spacing of the ribs is randomly varied around the circumference of the tire to broaden a vibration spectrum caused by the ribs and reduce peak vibrations. Fourthly, a wheel rim that supports the annular body is provided with a structurally incorporated hoop to reduce deflection of the wheel rim during tire operation.

13 Claims, 4 Drawing Sheets

NON-PNEUMATIC TIRE WITH VIBRATION REDUCING FEATURES

BACKGROUND OF THE INVENTION

1. Field of Invention

This invention relates to non-pneumatic tires and, more particularly, to a ribbed or spoked non-pneumatic tire provided with vibration reducing features.

2. Description of the Related Art

Recently, much emphasis has been placed on vehicle fuel efficiency which has fostered intensive research for the purpose of reducing vehicle weight and, in turn, reducing vehicle fuel requirements. One aspect of vehicle design that has received particular attention is the size and weight of the typical spare tire carried in a vehicle for emergency use in replacing flat or defective pneumatic tires.

While the advent of the mini-spare tire has lowered the size and weight of the typical spare tire carried in most vehicles, the non-pneumatic tire holds even more promise for reducing weight and volume. Non-pneumatic tires have been used as industrial tires, off-the-road tires, bicycle tires, wheel barrow tires, and the like. They have not been completely satisfactory in many of these applications because they have not had suitable cushioning and handling characteristics. Also, where the non-pneumatic tires have been solid tires, heat buildup and subsequent degradation of the elastomeric materials comprising the tire body, have limited the uses of such solid non-pneumatic tires.

Ribbed or spoked constructions of non-pneumatic tires have been developed that appear to alleviate many of these drawbacks. One recent development of a non-pneumatic tire by Uniroyal, Inc. comprises an annular body of resilient elastomeric material including an outer cylindrical member and a coaxial, coextensive, inner cylindrical member for mounting on a wheel rim. The outer cylindrical member is supported and cushioned by circumferentially spaced-apart rib members and one or more web members. The rib members extend generally axially of and alongside the web member. The web member lies in a plane that is perpendicular to the rotational axis of the tire. The inner and outer cylindrical members, rib members, and web members are integral with one another.

The purpose of the web and rib members is to provide a load-carrying structure that absorbs bumps during operation of a tire over a road surface.

One of the problems, however, with ribbed or spoked non-pneumatic tires is that unacceptably high levels of noise and vibration are produced by many of the current generation of spoked non-pneumatic tires. While it is somewhat desirable to provide a spare tire that produces relatively higher levels of road noise for the purpose of reminding the driver that the spare tire should be replaced with a conventional pneumatic tire, the level of noise and vibration must still be held to an acceptable level to avoid unnecessarily disturbing the passengers inside the vehicle.

Accordingly, a primary object of this invention is to provide a non-pneumatic tire having a load-carrying and cushioning structure that does not cause unacceptable levels of noise or vibration during vehicle operation.

Another object of this invention is to provide a non-pneumatic tire with radial ribs supporting an outer tread surface that incorporates various structural features to reduce noise and vibration caused by the non-pneumatic tire during vehicle operation.

A further object of this invention is to provide a non-pneumatic tire with a tread surface that provides adequate traction and is specifically structured to reduce vibration during vehicle operation.

Further objects and advantages of this invention will become apparent from the following description.

SUMMARY OF THE INVENTION

Briefly stated, and in accordance with one embodiment of this invention, four separate structural features are incorporated into a ribbed or spoked non-pneumatic tire structure, such as the tire described above, to reduce vibration to acceptable levels while maintaining durability and appropriate levels of traction and cornering. First, the outer tread surface is provided with a crown radius rather than a flat surface. Secondly, the tread pattern is specifically constructed with a plurality of lateral angle grooves specifically arranged to reduce uneven contact pressures and resulting vibrations, but at the same time avoid excessive shear forces. Thirdly, the spacing of the radial rib members is varied around the circumference of the tire to broaden the vibration spectrum and reduce unacceptable peak vibrations. The spacing can be varied by up to 20% or more from uniform spacing. When spacing variation is combined with variation in rib-member thickness, the impact of spacing variation on durability is decreased. Fourthly, the wheel rim which supports the circumferential cylindrical member, is provided with in-board reinforcing in the form of a hoop structurally incorporated into the wheel rim. The purpose of this structural reinforcing is to reduce deflection of the wheel rim and provide a more uniform foundation for the tire because such deflections of the wheel rim actually amplify the force variation caused by the rib members which increases vibration created by the tire during vehicle operation.

BRIEF DESCRIPTION OF THE DRAWINGS

While the specification concludes with claims particularly pointing out and distinctly claiming the subject matter regarded as the invention, it is believed that the invention will be better understood from the following description, taken in conjunction with the accompanying drawings, in which:

DETAILED DESCRIPTION OF THE PREFERRED EMBODIMENT

Figure 1:
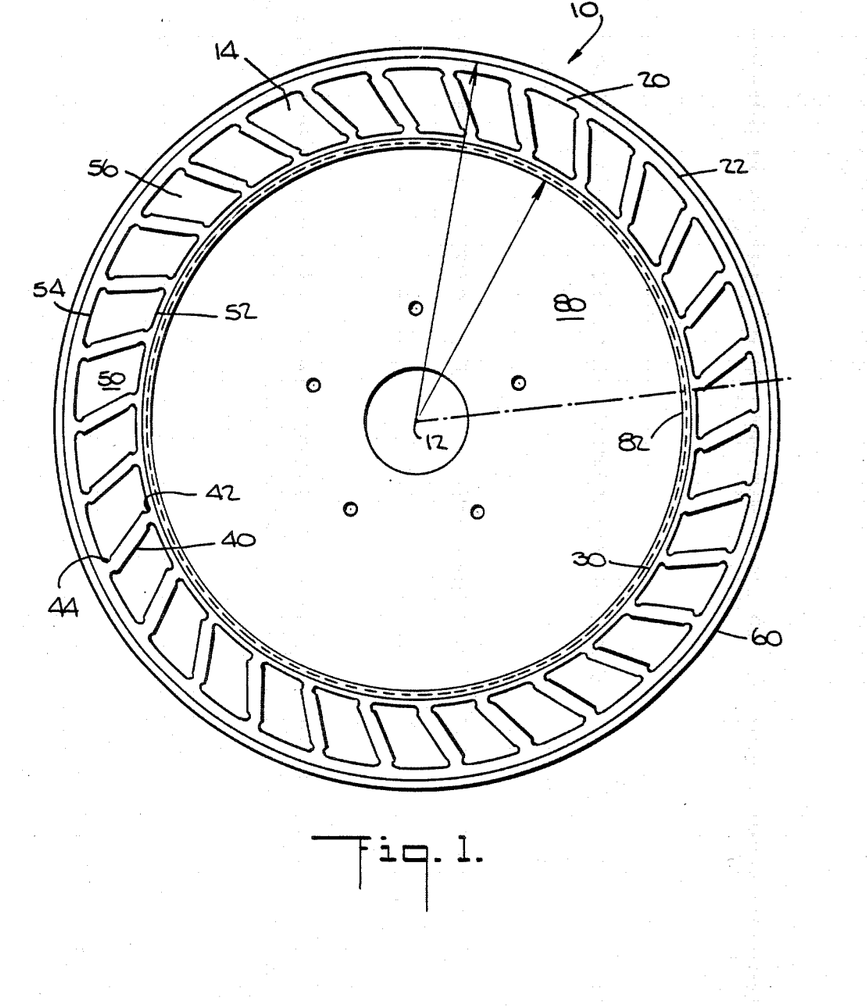
FIG. 1 is a side elevation view of a non-pneumatic tire and wheel rim member.

Referring now to FIG. 1 a non-pneumatic tire 10 is shown that tends to develop a contact patch during tire operation with high and low contact pressures around its tread surface 60. This variation is due to high pressures created directly under load-carrying spokes or rib members 40 and low pressures created between the rib members. These variations in pressure will tend to create both a ride vibration and a noise disturbance which can be severe enough to be unacceptable to vehicle occupants. To reduce these levels of noise and vibration to acceptable levels for operation in modern vehicles, a combination of structural features has been developed by the inventors of the subject invention.

This combination includes the following:
(1) a crown radius to the outside surface of the tire instead of a flat surface;
(2) a tread pattern that interacts with high and low contact pressure areas to reduce vibration;
(3) a non-uniform spacing pattern of the rib members around the circumference of the tire; and
(4) a rigid, hoop structure incorporated in a tire rim surface to stabilize the tire structure during vehicle operation.

Each of these four structural features will help reduce noise and vibration individually. A combination of all four features can work together to provide a non-pneumatic ribbed tire with acceptable levels of vibration and noise.

Figure 2:
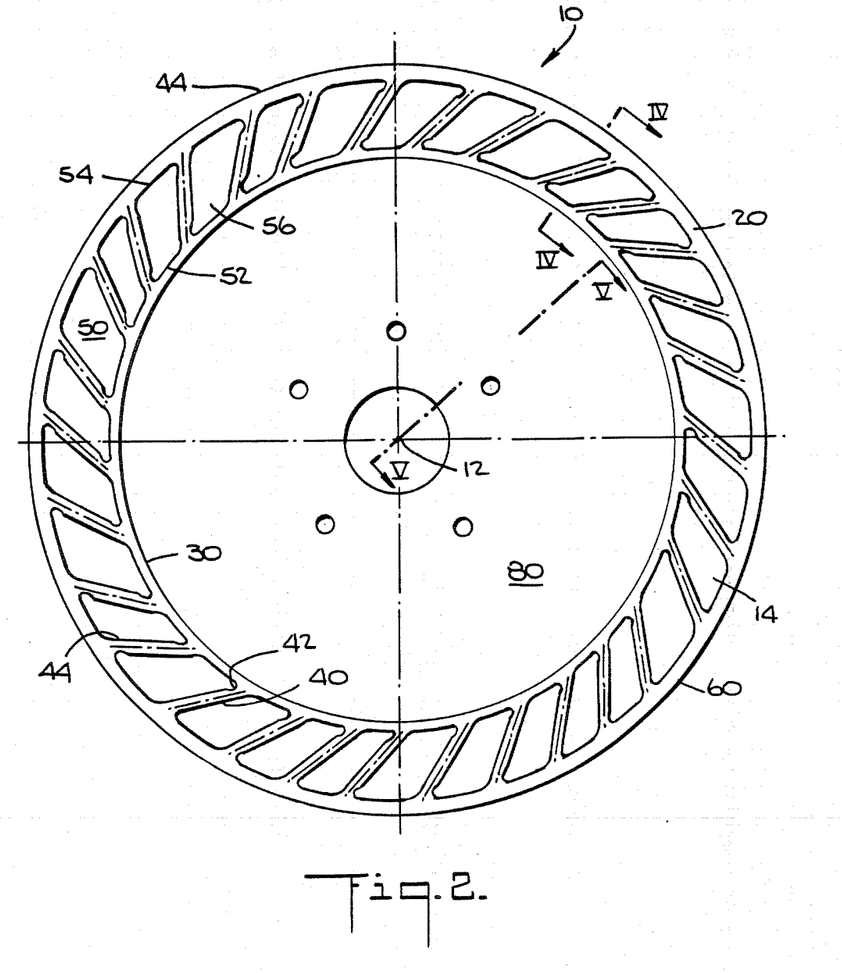
FIG. 2 is a side elevation view of a non-pneumatic tire and wheel rim, member in a preferred embodiment of the invention.
Figure 4:
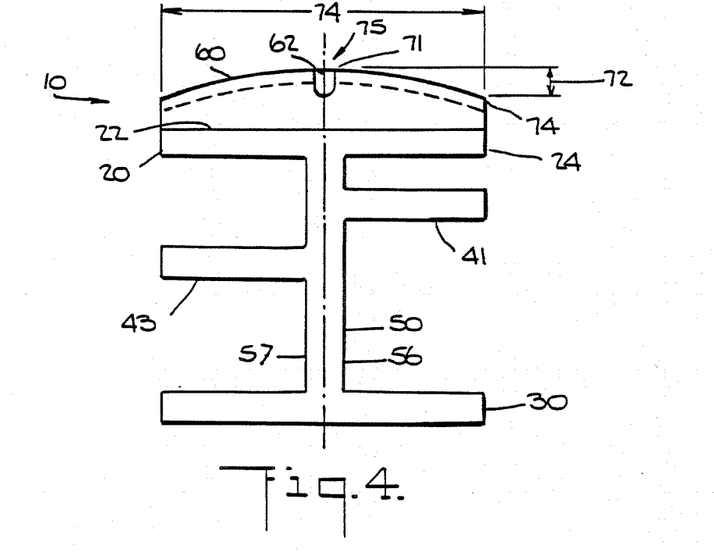
FIG. 4 is a cross-sectional view of the non-pneumatic tire of this invention taken along line IV—IV of FIG. 2.

Referring briefly to FIGS. 2, and 4, a non-pneumatic tire 10 incorporating the features of the subject invention is shown. The structure that is shown on FIG. 1, is representative of a non-pneumatic structure that could easily accommodate the four structural features referred to above but has not been appropriately modified. Various other non-pneumatic tire structures, similar to the tire shown in FIG. 1, with discrete load carrying members, such as spokes or ribs will also accommodate the vibration reducing features described herein.

The non-pneumatic tires 10 shown in FIGS. 1 and 2, are designed to operate around a central tire axis 12 with a wheel rim member 80 radially emanating from around the central axis 12. An annular body 14 is mounted on an outer cylindrical surface 82 of the wheel rim member 80. The annular body 14 is preferably made of a resilient elastomeric material and has an outer cylindrical member 20 at the outer periphery thereof on which a tread 60 is mounted or structurally incorporated. The annular body 14 is also provided with an inner cylindrical member 30 at its inner periphery which is adhered to or otherwise fastened to the outer cylindrical surface 82 of the wheel rim member 80. The inner cylindrical member 30 is coaxial to, and coextensive with the outer cylindrical member 20.

Referring now to FIG. 4, the outer cylindrical member 20 is supported and cushioned by a plurality of circumferentially spaced-apart rib members or ribs 40, which are provided on both sides of a central web member 50. The central web member 50 is generally planer and is connected on one of its side faces 56 to a first set of rib members 41 and on its opposite side face 57 to a second set of rib members 43.

The central web member 50 is positioned midway between the axial ends of the inner and outer cylindrical members 20 and 30. It is connected at its inner periphery to the inner cylindrical member 30 and is connected at its outer periphery to the outer cylindrical member 20. Similarly, the various rib members 40, are connected at their radially inner ends 42 to the inner cylindrical member 30 and at their radially outer ends 44 to the outer cylindrical member 20. The rib members 40 may be undercut where their ends connect to the inner and outer cylindrical members, to enhance flexibility at their connections and reduce rib bending at normal operating loads.

Referring again to FIGS. 1 and 2, the rib members 40 extend generally axially along the inner and outer cylindrical members 30 and 20 and, in the embodiments shown in FIGS. 1 and 2 are inclined at an angle of between 15 degrees and 75 degrees to radial planes which intersect them at their junctions with the inner cylindrical member 30. In alternate embodiments, the rib members 40 can be extended radially with no angle or with an angle of between 0 degrees and 15 degrees. The web member 50 in the embodiment shown lies in a plane that is perpendicular to the rotational axis 12 of the non-pneumatic tire 10.

These embodiments, as described, are representative of a structural configuration of the non-pneumatic tire 10 that can accommodate all of the four vibration-reducing features of this invention. Various other structural configurations of the non-pneumatic tire 10 using discrete ribs or spokes will just as readily accommodate the vibration-reducing features of this invention, either individually or as a group. Various other structural modifications might include multiple web members 50, angled web members, axially angled rib members 40 and a variety of other workable configurations.

Each of the four vibration-reducing features is described, below, in detail.

Crown Radius

Referring to FIG. 4, a cross section is shown of the annular body 14 and an attached tire tread 60. The cylindrical outer member 20, as shown, has an axially flat outer surface 22. The cylindrical outer member 20 may also have a curved outer surface with a designated radius of curvature. The tread 60 is glued or otherwise adhered to this flat outer surface 22 or, alternatively, can be inherently molded into the cylindrical outer member 20 as an integral part thereof. It can be readily appreciated from FIG. 4 that the surface of the tread 60 is curved radially outwardly or, in the words of the inventors, is formed with a crown radius. The purpose of this crown radius is to reduce the high contact pressures in the areas of the surface of the tread 60 that are radially opposite the ribs 40. The ribs 40 extend axially outwardly on either side of the central web member 50 and if the crown radius were not provided, would tend to create very high contact pressures in the regions where they intersect the outer cylindrical member 20 at the axially outer edges of the contact area of the tread 60.

While a greater amount of curvature, meaning a shorter radius of curvature, is desirable to lessen high contact pressures at the axial edges, too much curvature tends to lower the effective contact area and leads to a reduction in cornering capabilities of the non-pneumatic tire. It has been found by the inventors that an acceptable range of crown radius curvature has been found to be between 400 and 600 percent, where per cent crown radius is defined as a radius of curvature of the tread surface divided by section width of the tread 60 (indicated by the arrow 74 in FIG. 4) times 100. The radius of curvature will result in a difference in radial height as indicated by arrow 72 in FIG. 4. It is estimated by the inventors that if the crown radius approaches 300 percent, the cornering forces of the tire fall off by approximately 12 percent. This kind of reduction approaches the limit of unsatisfactory cornering forces. At 500 percent crown radius, the reduction in cornering forces is only between 2 and 3 percent, while the ratio of contact forces, meaning the pressure of the tread 60 on a road surface under a rib 40, versus pressure between ribs 40, is reduced by approximately 30 percent. This kind of reduction in contact pressure force variation has a very beneficial effect on reducing vibration and resulting noise caused by the non-pneumatic tire 10.

Tread Pattern

Figure 3:
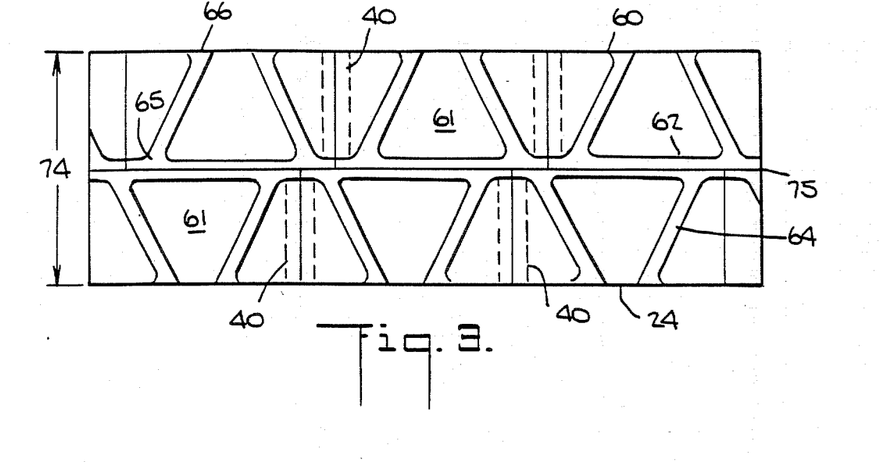
FIG. 3 is an elevation view of a portion of a tire tread of the invention.

A tread pattern on the outside tire surface is necessary for traction in wet or snow covered conditions. Referring now to FIGS. 3 and 4, the tread 60 is shown in a configuration that provides traction and structurally takes advantage of the embodiment of the ribs 40 (shown in dashed outline in FIG. 3) and web 50 (shown in FIG. 4). More specifically, the pattern of the tread 60 is configured to interact with the directional aspects of forces exerted by the ribs and web to lessen force variations along the surface of the tread. In a non-pneumatic spoked tire, the tread design influences the contact forces and interacts with the spokes and grooves in a manner that affects both force variation and durability. Tread grooves placed parallel to and directly radially outwardly of the ribs 40 will reduce contact pressure on the tread surface radially outwardly of the rib, but will also increase shear forces in the tread surface. Therefore, the inventors have determined that at the present stage of development, tread grooves should not be placed directly radially outwardly of and parallel to the ribs 40.

In contrast, it has been found that a thin center groove or grooves 62 placed radially outwardly of a central web 50 (as shown on FIG. 4) will help reduce heat buildup in a critical area while shear forces are not increased to an unacceptable level. The axial width of of a single center groove 62 should be less than the axial width of the corresponding web 50 to avoid excessive shear forces but may be wider if two or more grooves are placed radially outwardly of and axially spaced from the web. The central groove or plurality of grooves 62 is provided around the entire circumference of the tread 60.

To improve traction, generally lateral grooves 64 should be provided in addition to one or more circumferential grooves. Being primarily lateral in direction, these grooves 64 intersect the central circumferential groove 62 at their axially inner ends 65 and extend across the outer surface of the tread 60 to its axially outer border 66. The inventors have found that grooves positioned at an angle in respect to a radial projection of the ribs 40 on the tread surface, do not appear to unacceptably affect durability, but do favorably decrease force variations on the tread surface. To utilize this relationship, lateral angular grooves 64 for gripping can be positioned closer to the ribs 40 near the crown center 75 while being angled away from the ribs 40 at the axially outer border 24. The tread pattern shown in FIG. 3 embodies this principal. Angled lateral grooves 64 are grouped in pairs so as to form essentially triangular-shaped tread blocks 61 positioned radially outwardly of corresponding rib members 40. Each of these tread blocks 61 is positioned so that forces directed radially from each rib member are carried somewhat centrally on a corresponding tread block 61.

Another embodiment (not shown) that also favorably reduces force variations on the tread surface is a pattern of lateral angled grooves wherein some of the grooves cross over the radial projection of the ribs on the tread surface. By positioning a lateral angled groove to cross over the rib projection radial forces from the rib are more evenly distributed on the tread surface, yet shear forces in the tread material do not appear to exceed unacceptable levels.

It is contemplated that new tread patterns will be developed that will be different structurally but will still incorporate lateral grooves having axially inner ends positioned closer to a corresponding rib member than are their axially outer ends, or alternatively, will cross a radial projection of the rib members at an angle to that projection.

Rib Spacing

Referring again to FIGS. 1 and 2, two alternate embodiments are shown of a non-pneumatic tire 10. FIG. 2 is a preferred embodiment and incorporates a non-uniform spacing of the ribs 40. In contrast, FIG. 1 shows the ribs 40 placed uniformly around the circumference of the tire 10.

The rib spacing and, correspondingly, the tread pattern can be varied around the tire 10 to broaden the vibration spectrum and reduce unacceptable peak vibrations. The inventors have varied the distance between ribs up by to 20% from uniform spacing distance without unacceptably affecting durability. Future development might show that larger variations can also be incorporated. In addition, any effect on durability can be lessened by correspondingly varying rib thickness dimension.

Rib thickness and spacing variation has been defined by first defining and experimentally evaluating proper rib thickness and spacing in a tire with uniformly spaced ribs, such as the tire shown in FIG. 1. The outside diameter of the tire in FIG. 1 happens to be 21.00 inches (53.34 cm.) with 30 ribs spaced uniformly about the circumference. The distance between ribs 40 from centerline to centerline is the circumferential distance divided by the number of ribs or, in this case, 21 inches times pi/30=2.20 inches (5.59 cm.)

This value of 2.20 inches was determined to be the median value in rib spacing for a non-uniformly space tire (sequenced tire). In FIG. 2, rib spacing is arbitrarily varied by plus or minus 20 per cent from uniform with intermediate spacing of plus or minus 10 per cent from uniform. This provides a five pitch spacing arrangement of 1.76 in., 1.98 in., 2.20 in., 2.42 in. and 2.64 in. (4.47 cm., 5.03 cm., 5.59 cm., 6.15 cm., 6.71 cm.). Corresponding pitch numbers are 1=1, 2, 3, 4, 5. By frequency analysis used to compliment tread block spacing, a randomly repeating sequence of the following array was determined:

1, 2, 3, 4, 2, 5, 4, 3, 5, 1, 3, 4, 2, 5, 4, 3, 5, 1, 1, 2, 2, 5, 4, 3, 5, 1, 1, 2, 3, 4.

The two highest pitches (5) were not placed adjacent to each other to avoid creating the theoretically longest possible tire tread surface that would be unsupported by underlying ribs.

Rib thickness is also varied so as to maintain an essentially uniform tire spring rate around the tire's outer circumference. Referring again to FIG. 1, in a uniformly spaced tire, the ribs are 0.300 inches thick (0.76 cm.). Each rib carries up to approximately one half the load in a tire contact patch, disregarding the load carried by the web 50. This situation occurs when the load is centered on a rib 40 because no other ribs from the same side of the tire 10 come into contact with the ground.

The relationship for defining rib thickness is as follows:

$$\frac{\text{median rib thickness}}{\text{supported tread distance}} = \frac{.300 \text{ inch rib}}{2 \ (2.20 \text{ inches})} = \frac{T}{L}$$

where T=any rib thickness at a particular location and L=total circumferential length for any two adjacent pitch lengths. By this formula, it can be calculated, for example, that a rib with adjacent spaces corresponding to a 1 and 2 pitch numbers, would have a thickness calculated as follows:

$$\frac{.3}{4.4} = .068 = \frac{T}{L} \text{ therefore}$$

$$T = .068 \ L$$
$$T = 0.68 \ (1.76 + 1.93) = .254 \text{ in.}$$

Therefore, the thickness of this particular rib is 0.254 in. (0.645 cm.). The thickness of other ribs would be calculated in the same manner.

Rigid Member on Rim

Referring again to FIGS. 1 and 2, the rigid wheel rim member 80 is shown which supports the annular body 14. This wheel rim member 80 can be constructed from a variety of materials including steel, aluminum, fiberglass reinforced plastic, and other materials as well. The configuration of the wheel rim member 80 has an effect on vibration generation as well as wheel durability. One objective of rim configuration is to achieve maximum rigidity across the width of the annular body 14 during wheel operation.

One of the problems in constructing the wheel rim is that present-day front wheel drive vehicles often require large offset. This offset necessitates a cantilever type configuration.

Figures 5, 6:
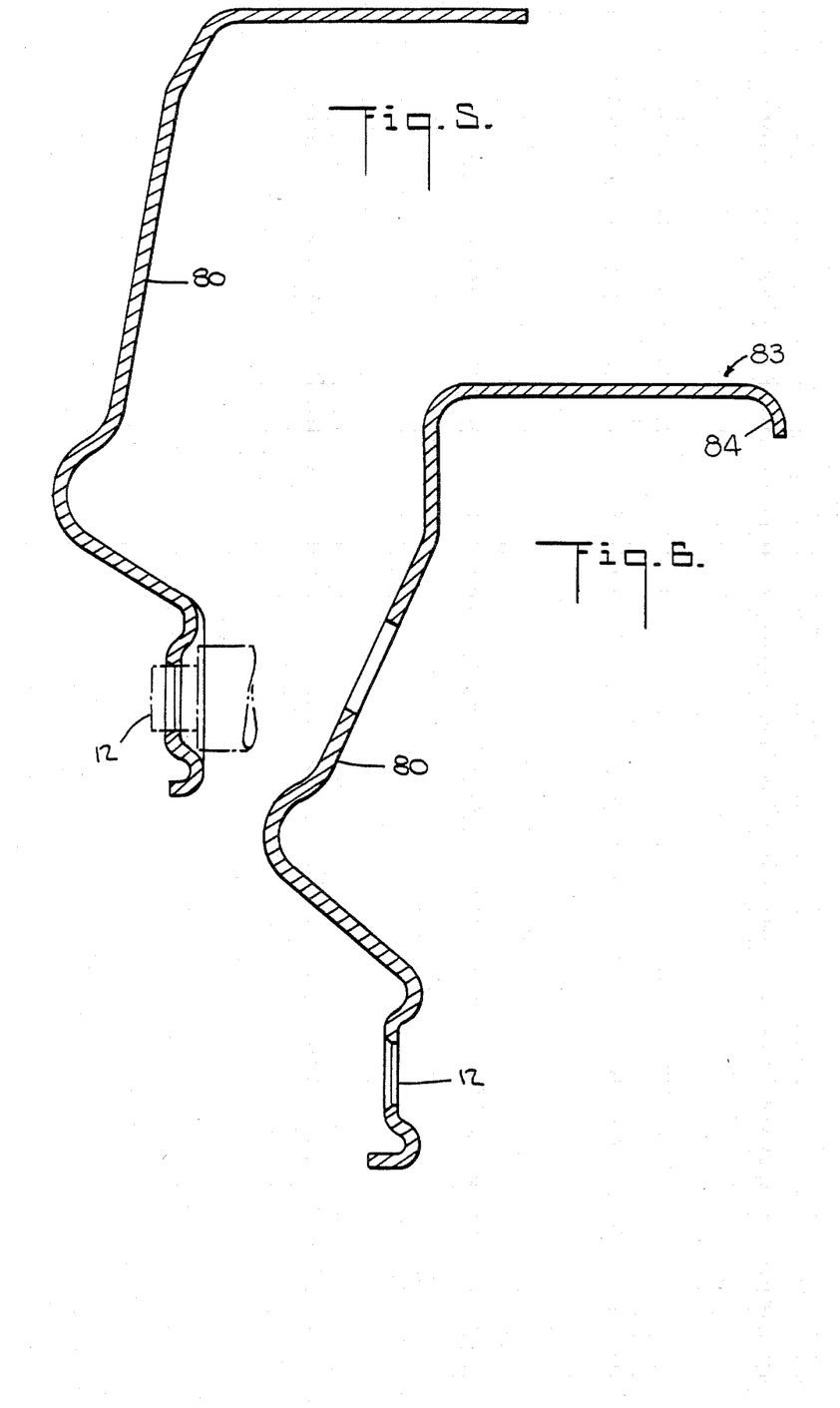
FIG. 5 is a cross-sectional view of a portion of a wheel rim member taken along line V—V of FIG. 2.
FIG. 6 is a cross-sectional view of an alternate embodiment of the wheel rim member.

Referring now to FIGS. 5 and 6 typical cantilever arrangements of the wheel rim member 80 are shown. One configuration is shown in FIG. 5 which is relatively easy to manufacture and yields a low mass component. Models such as the rim shown in FIG. 5 were found to deflect up to 0.060 inches (0.1524 cm.) at design loads. Cyclic loading under this magnitude of deflection can adversely affect wheel durability and amplify force variations caused by rib members by emphasizing the higher loaded ribs on the axially outer side of the tire 10 while lowering the loads on the inside ribs.

To lessen rim member deflection at the axially inner region 83 of the rim member, a configuration was developed as shown in FIG. 6. An in-board circumferential hoop 84 is incorporated into the rim's configuration, which substantially improves rigidity and thus provides a more uniform foundation for the tire 10. Providing this circumferential hoop 84 is expected to require an additional step in manufacturing the wheel rim member 80, however, weight is not significantly affected. At the present stage of development, it is believed that beneficial effects of the circumferential hoop 84 easily outweigh the additional manufacturing considerations.

It is contemplated that the circumferential hoop of material might be positioned in various other locations on the wheel rim member 80 or might be turned up or turned down or might even form a complete roll.

It will be understood that the foregoing description of the preferred embodiment of the subject invention is for purposes of illustration only, and that various structural and operational features as herein disclosed are susceptible to a number of modifications none of which entail any departure from the scope of the subject invention as defined in the following claims.

What is claimed is:

1. A non-pneumatic tire rotatable about an axis, comprising an annular body of resilient material and having the following:
   (a) a generally cylindrical outer member at the outer periphery thereof:
   (b) a plurality of radially extending circumferential spaced-apart rib members connected at their outer ends to said cylindrical outer member for the purpose of structurally supporting said cylindrical outer member; and
   (c) a tread provided on said cylindrical outer member on its outer surface, said tread comprising lateral grooves having axially inner and outer ends each of said axially inner ends being positioned at or near a central circumferential region of said tread, each of said axially outer ends intersecting an axially outer border of said tread, and each of said axially inner ends being positioned closer to a corresponding rib member than each of said axially outer ends.

2. A non-pneumatic tire rotatable about an axis, comprising an annular body of resilient material and having the following:
   (a) a generally cylindrical outer member at the outer periphery thereof;
   (b) a generally cylindrical inner member spaced radially inwardly from and coaxial with said outer member:
   (c) a plurality of axially extending, circumferentially spaced-apart rib members connected at their corresponding inner and outer ends to said inner and outer cylindrical members;
   (d) a central web member having its inner and outer peripheries connected respectively to said inner and outer cylindrical members and having its side faces connected to said rib members; and
   (e) a tread provided on said cylindrical outer member on its outer surface, said tread being provided with:
      (i) a central circumferential groove positioned radially outwardly of said central web member, and
      (ii) generally lateral grooves each having an axially inner and outer end, each of said axially inner ends intersecting said central circumferential groove and being positioned closer to a corresponding rib member than each of said axially outer ends.

3. A tire as recited in claim 2 wherein the lateral grooves of said tread pattern intersect said central circumferential groove at their axially inner ends and extend across the outer surface of said outer cylindrical member to its axially outer border.

4. A tire as recited in claims 1 or 3 wherein said lateral grooves are angled in respect to said tire axis and are arranged in pairs so as to form essentially triangular shaped tread blocks positioned radially outwardly of corresponding rib members.

5. A tire as recited in claim 4 wherein said triangular shaped tread blocks that correspond to rib members are positioned to carry radial force from said corresponding rib members somewhat centrally on said triangular-shaped tread blocks.

6. A tire as recited in claim 5 wherein said rib members are circumferentially positioned in a sequenced pattern having a variation in circumferential distance between rib members for the purpose of reducing vibration during operation of said tire.

7. A tire as recited in claim 2 wherein said tread has an outer surface with a crown radius.

8. A tire as recited in claim 7 wherein said crown radius is in a range of between 400 and 600 percent, whereby percent crown radius is equal to radius of curvature of said tread, divided by tread surface sectional width times 100.

9. A tire as recited in claims 1 or 2 wherein said annular body of resilient material is mounted on a cylindrical outer surface of a wheel rim member, said wheel rim member having a structurally incorporated circumferential hoop for the purpose of increasing structural rigidity of said wheel rim member.

10. A non-pneumatic tire rotatable about an axis, comprising an annular body of resilient material and having the following:
    (a) a generally cylindrical member at the outer periphery thereof;
    (b) a generally cylindrical inner member spaced radially inwardly from and coaxial with said outer member;
    (c) a plurality of radially extending, circumferentially spaced-apart rib members connected at their corresponding inner and outer ends to said inner and outer cylindrical members; and
    (d) said rib members being positioned in a non-uniform pattern for the purpose of reducing vibration during operation of said non-pneumatic tire.

11. The tire as recited in claim 10 wherein said ribs are positioned in a random pattern around the circumference of said tire and distance between said rib members varies by not more than twenty per cent from the median distance between said rib members.

12. A non-pneumatic tire rotatable about an axis, comprising an annular body of resilient material and having the following:
    (a) a generally cylindrical outer member at the outer periphery thereof;
    (b) a generally cylindrical inner member spaced radially inwardly from and coaxial with said outer member;
    (c) a plurality of axially extending, circumferentially spaced-apart rib members connected at their corresponding inner and outer ends to said inner and outer cylindrical members so as to support and cushion said outer member;
    (d) a central web member having its inner and outer peripheries connected respectively to said inner and outer cylindrical members and having its side faces connected to said rib members; and,
    (e) a tread surface circumferentially surrounding said cylindrical outer member, said tread surface having a crown radius.

13. A method of reducing noise and vibration in a non-pneumatic tire rotatable about an axis, said tire comprising an annular body of resilient material and having the following:
    (a) a generally cylindrical outer member at the outer periphery thereof;
    (b) a generally cylindrical inner member spaced radially inwardly from and coaxial with said outer member;
    (c) a plurality of axially extending, circumferentially spaced-apart rib members connected at their corresponding inner and outer ends to said inner and outer cylindrical members so as to support and cushion said outer member; said method comprising the steps of
    providing a crown radius on the outer surface of said outer member,
    forming a tread pattern which interacts with high and low contact pressure areas to reduce vibration,
    spacing said rib members in a non-uniform pattern around the circumference of said tire, and,
    stabilizing said tire with a rigid hoop to obtain maximum rigidity of said tire.

* * * * *

UNITED STATES PATENT AND TRADEMARK OFFICE
CERTIFICATE OF CORRECTION

PATENT NO. : 4,784,201

DATED : November 15, 1988

INVENTOR(S) : Richard L. Palinkas, Scott R. Pajtas, and George H. Nybakken

It is certified that error appears in the above-identified patent and that said Letters Patent is hereby corrected as shown below:

Column 8, Line 13 ":" should read -- ; --

Column 8, Line 14 "circumferential" should read
-- circumferentially --

Column 8, Line 21 between "ends" and "each"
insert -- , -- thereat

Column 8, Line 35 ":" should read -- ; --

Column 8, Line 36 "axially" should read -- radially --

Column 8, Lines 37-38 "corresponding" should read
-- respective -- .

Column 8, Lines 44-45 "said cylindrical outer member
on its outer surface" should read -- the outer surface
of said cylindrical member --

Signed and Sealed this

Sixth Day of February, 1990

*Attest:*

JEFFREY M. SAMUELS

*Attesting Officer*       *Acting Commissioner of Patents and Trademarks*